Feb. 12, 1935. R. J. BRITTAIN, JR 1,991,077
SEAL OR GUARD
Filed Jan. 26, 1931

INVENTOR
RICHARD J. BRITTAIN, JR.
BY
Galeo P. Moore,
HIS ATTORNEY.

Patented Feb. 12, 1935

1,991,077

UNITED STATES PATENT OFFICE 1,991,077

SEAL OR GUARD

Richard J. Brittain, Jr., Bloomfield, N. J., assignor to General Motors Corporation, Detroit, Mich., a corporation of Delaware Application January 26, 1931, Serial No. 511,173

3 Claims. (Cl. 286—5)

This invention relates to seals or guards and comprises all the features of novelty herein disclosed. An object of the invention is to provide an improved seal or guard for closing the space between a shaft and a casing, as to avoid leakage of lubricant from the casing and/or access of foreign matter to the casing. Another object is to provide a seal or guard especially adapted for railway journal boxes wherein a shaft or axle projects into the journal box and rotates therein while subject to intermittent longitudinal shifting.

To these ends and to improve generally upon devices of this character, the invention consists in the various matters hereinafter described and claimed. In its broader aspects, the invention is not necessarily limited to the specific constructions selected for illustrative purposes in the accompanying drawing in which:

Figure 1:
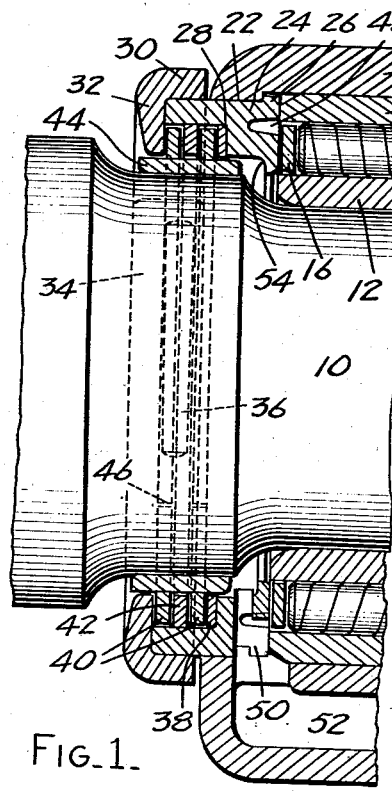
Fig. 1 is a vertical section of a portion of a journal box.

The reduced end of a shaft or axle 10 carries a raceway sleeve 12 for roller bearing 14 having cage rings 16. The rollers run in an outer sleeve 18 in the bore of an axle box 20 which is provided at one end with an opening 22 larger than the axle. Before the bearing parts are inserted, a ring or bushing 24 is passed through the box from its outer end until a flange 26 on the bushing engages the shoulder at the end of the bore. The bushing preferably has a press fit in the opening 22 and has a part projecting axially through and beyond the inner end of the box, this projecting part having a recess 28.

Figure 2:
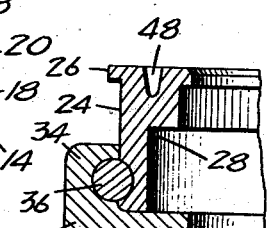
Fig. 2 is a horizontal section of a locking means.
Figure 3:
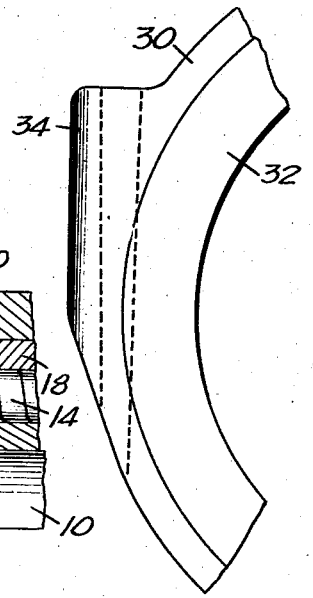
Fig. 3 is a side view of a portion of a ring.

A ring 30 surrounds the projecting part and has a flange 32 at the end thereof. The ring has side extensions or enlargements 34 and when the parts are assembled as indicated in Fig. 2, they are bored and reamed to receive a taper pin 36. Previous to locking the parts with the taper pin, a set of rings 38, 40 and 42 are inserted in the recess 28. The ring 38 is preferably of steel and has a sliding fit in the recess, the rings 40 are preferably split spring rings of bronze, and the ring 42 is preferably a steel ring having a sliding fit in the recess. Pressed on the axle is a steel sleeve 44 which has a slight clearance with the ring 38 and the flange 32. The split rings 40 tend to contract to grip the sleeve 44, to clear the surrounding walls of the recess 28, and to bring their ends 46 close together.

The inner end of the bushing has a flat face to engage the sleeve 18 and to guide the adjacent cage ring 16. This face has a relief groove 48 about opposite to the bore of the sleeve 18 so that lubricant, propelled by the spiral rollers, can escape and drain through a notch 50 into a lubricant passage 52 at the bottom of the box. Lubricant entering an internal groove 54 in the bushing will also drain down through the notch 50. The groove 54 also provides clearance for the sleeve 44 when the axle shifts endwise. The nested rings form an efficient seal and labyrinth to prevent escape of lubricant from the box and admission of foreign matter thereto.

Figure 4:
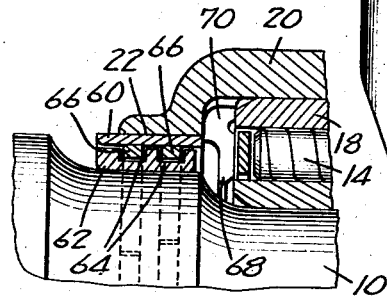
Figs. 4, 5, 6 and 7 are vertical sectional views of modified forms of the invention.

In Fig. 4, the opening 22 at the end of the box 20 is closer to the axle and receives a plain ring or sleeve 60 with a press fit. A sleeve 62 having a plurality of peripheral grooves 64 between annular projections is fitted on the axle with a press fit. A split ring 66 is carried in each groove and tends to expand against the smooth bore of the sleeve 60. The rollers are guided by a flange 68 on the box, the flange having a notch 70 providing for access to the end of the bearing sleeve 18.

Figure 5:
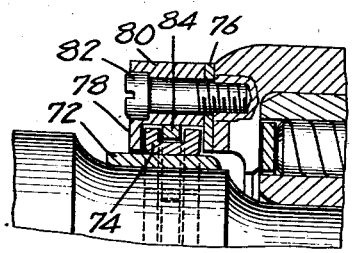

In Fig. 5, a sleeve 72 is carried by the axle and engages a U-shaped spring ring 74 which tends to contract. The ring is retained against axial movement by a washer 76 and a flange 78 on a holding ring 80, the ring 80 and the washer being secured to the box by screws 82. Inside the ring 80 and occupying the groove of the split ring 74 is a plain split ring 84 which tends to expand.

Figure 6:
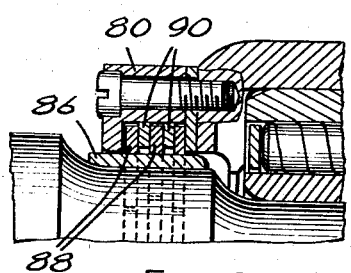

In Fig. 6, a sleeve 86 on the axle is engaged by a plurality of plain split rings 88 which are preferably of brass and tend to contract. The rings 88 alternate with rings 90 which are either split or solid to engage the holding ring 80.

Figure 7:
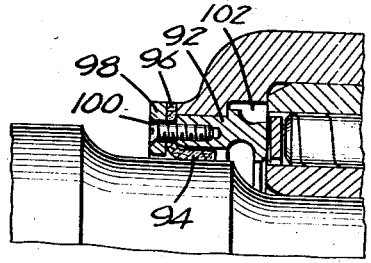

In Fig. 7, a bushing 92 on the box closely surrounds the axle and a washer 94 is interposed, the washer being preferably of rawhide and having a flange 96 which is secured against the end of the bushing by a plate 98 with fastening screws 100 whose heads may be secured by prick-punching them to the plate. The inner end of the bushing is spaced from the surrounding wall of the box and provided with an external relief groove 102.

I claim:

1. In a device of the character described, a casing, a shaft extending into the casing, a bushing projecting from the casing and having an internal recess, a ring surrounding the projecting end of the bushing and having a flange closing one end of the recess, a sleeve carried by the shaft and surrounded by the bushing and the flange, and a series of rings in the recess, some of said rings being split and the alternate rings being unbroken; substantially as described.

2. In a device of the character described, a casing, a shaft extending into the casing, a bushing projecting from the casing and having an internal recess, a ring surrounding the projecting end of the bushing and having enlargements, locking pins traversing the enlargements and engaging the projecting portion of the bushing, the ring having a flange extending across the projecting end of the bushing to close the end of the recess, and a series of sealing rings in the recess and arranged to form a labyrinth; substantially as described.

3. In a device of the character described, a casing having an opening, a shaft extending through the opening into the casing, a bushing fitting the opening and surrounding the shaft, bearings between the shaft and the casing, the bushing having a portion projecting axially from the casing to form a recess, a ring surrounding the axially projecting portion of the bushing and having a flange closing the recess, rings in the recess, and a sleeve fitting on the shaft and engaging some of the rings; substantially as described.

RICHARD J. BRITTAIN, Jr.